(12) United States Patent
Pain et al.

(10) Patent No.: US 6,519,371 B1
(45) Date of Patent: Feb. 11, 2003

(54) HIGH-SPEED ON-CHIP WINDOWED CENTROIDING USING PHOTODIODE-BASED CMOS IMAGER

(75) Inventors: Bedabrata Pain, Los Angeles, CA (US); Chao Sun, San Marino, CA (US); Guang Yang, West Covina, CA (US); Thomas J. Cunningham, Pasadena, CA (US); Bruce Hancock, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/677,972

(22) Filed: Oct. 2, 2000

Related U.S. Application Data
(60) Provisional application No. 60/157,556, filed on Oct. 4, 1999, and provisional application No. 60/157,211, filed on Sep. 30, 1999.

(51) Int. Cl.[7] .......................... G06K 9/36; H04N 5/225
(52) U.S. Cl. ...................... 382/288; 348/171
(58) Field of Search ............................ 382/288, 312, 382/205, 304, 173, 315, 318; 345/173, 46, 55; 348/171, 294, 302, 308, 309; 250/370.08

(56) References Cited

U.S. PATENT DOCUMENTS

| 5,175,802 A | 12/1992 | Crookshanks | 382/281 |
|---|---|---|---|
| 5,463,388 A | * 10/1995 | Boie et al. | 341/33 |
| 5,576,763 A | 11/1996 | Ackland et al. | 348/308 |
| 5,648,642 A | 7/1997 | Miller et al. | 341/33 |
| 5,693,946 A | * 12/1997 | Vickers et al. | 250/370.08 |
| 5,825,352 A | * 10/1998 | Bisset et al. | 345/173 |
| 5,835,141 A | 11/1998 | Ackland et al. | 348/308 |
| 5,854,100 A | 12/1998 | Chi | 438/202 |
| 5,867,152 A | * 2/1999 | Sextro | 345/207 |
| 6,058,223 A | * 5/2000 | Strohbehn | 382/312 |

OTHER PUBLICATIONS

Yang, David X. et al., Advanced Focal Plane Arrays and Electronic Cameras, Journal: Proc. SPIE vol. 2950, p. 8–17, Thierry M. Bernard; Ed., Oct. 1996.

Fox, Eric C. et al., Solid State Sensor Arrays; Development and Applications II, Journal: Proc. SPIE vol. 3301, p. 17–26, Morley M. Blouke; Ed., Jan. 1998.

* cited by examiner

Primary Examiner—Jose L. Couso
Assistant Examiner—Kanji Patel
(74) Attorney, Agent, or Firm—Fish & Richardson P.C.

(57) ABSTRACT

A centroid computation system is disclosed. The system has an imager array, a switching network, computation elements, and a divider circuit. The imager array has columns and rows of pixels. The switching network is adapted to receive pixel signals from the image array. The plurality of computation elements operates to compute inner products for at least x and y centroids. The plurality of computation elements has only passive elements to provide inner products of pixel signals the switching network. The divider circuit is adapted to receive the inner products and compute the x and y centroids.

15 Claims, 10 Drawing Sheets

HIGH-SPEED ON-CHIP WINDOWED CENTROIDING USING PHOTODIODE-BASED CMOS IMAGER

CROSS REFERENCE TO RELATED APPLICATION

This application claims the benefit of the priority of U.S. Provisional Application No. 60/157,556, filed on Oct. 4, 1999, and entitled Photodiode-based CMOS Active Pixel Sensor with Zero Lag, Low Noise and Enhanced Low-Light-Level Response; and U.S. Provisional Application No. 60/157,211, filed on Sep. 30, 1999, and entitled Smart CMOS Imager with On-Chip High-Speed Windowed Centroiding Capability.

ORIGIN OF INVENTION

U.S. Government may have certain rights in this invention pursuant to NASA contract number NAS7-1407.

BACKGROUND

Accurate computation of a centroid from a pre-defined window in an image plane is desirable for a number of space-based and commercial applications. The applications may include object tracking in robotic systems, autonomous navigation, image compression, and document copyright protection. Other applications may include space guidance and navigation systems, and deep-space optical communication systems that require accurate and stable beam pointing for high speed data transfer.

Off-focal-plane digital processors may yield accurate centroid values, but only at the cost of increased latency, power and size. On or near focal-plane centroid computation using current mode circuits, and neuro-MOS circuits have been implemented. However, neither approach may be compatibly integrated with high performance image sensors.

A photodiode-based active pixel imager (API) sensor may be used for high quality imaging applications such as the centroid computation. The photodiode-based sensor provides higher quantum efficiency than a photogate-based sensor. However, noise in the photodiode-type CMOS API sensors causes high reset (kTC) noise at the sense node.

SUMMARY

The present disclosure describes a centroid computation system having an imager array, a switching network, computation elements, and a divider circuit. The imager array has columns and rows of pixels. The switching network is adapted to receive pixel signals from the image array. The plurality of computation elements operates to compute inner products for at least x and y centroids. The plurality of computation elements has only passive elements to provide inner products of pixel signals the switching network. The divider circuit is adapted to receive the inner products and compute the x and y centroids.

BRIEF DESCRIPTION OF THE DRAWINGS

Different aspects of the disclosure will be described in reference to the accompanying drawings wherein.

DETAILED DESCRIPTION

The present disclosure describes an on-focal plane centroid computation circuit that is compatible and integrated with CMOS imagers implemented in conventional or modified CMOS technology. In the present disclosure, a photodiode-based CMOS active pixel sensor (APS) is described as an example of a CMOS imager that may be used.

Overview

The centroid computation circuit design allows accurate X- and Y-centroid computation from a user-selectable window of interest. The circuit also allows window location and size to be programmable. The circuit may be designed to dissipate less power than the prior art designs, which may enable a real-time, miniature tracking system. In one implementation, the centroid computation circuit utilizes a switched capacitor network having only passive elements such as capacitors and switches. The circuit further allows column-parallel computation that enables X- and Y-centroid computations to be performed substantially simultaneously. This provides low power consumption and high accuracy computation to better than 0.05 pixel accuracy. The accuracy may be achieved under most lighting conditions, while maintaining high update rates (20–50 KHz) that make the chip attractive for use in real-time image-based control systems.

The photodiode-based CMOS imager design provides improved steady state and dynamic response. In this design, both the pixel sensor and the clocking scheme are modified to allow imager operation with reset level independent of signal strength under steady state or dynamic conditions. The pixel is reset in "soft-reset" allowing low-reset noise and high power supply rejection ratio ("PSRR"). However, its steady state and dynamic response may be made to follow that obtained with "hard-reset". Hence, the design provides substantially reduced image lag and high linearity even under low-light levels compared to conventional imager designs. The image lag was measured to be less than 1% compared to 10% in conventional imagers with soft-reset. Further, no dead zone was found, with greater than 40 dB enhancement of low-light response. The present imager design also provides low noise and high PSRR. The noise was measured to be less than half the conventional devices with hard-reset. The PSRR was measured to be 40 dB higher than the hard-reset without bypass capacitor.

Description for Embodiments of Windowed-Centroiding System

Figure 1:
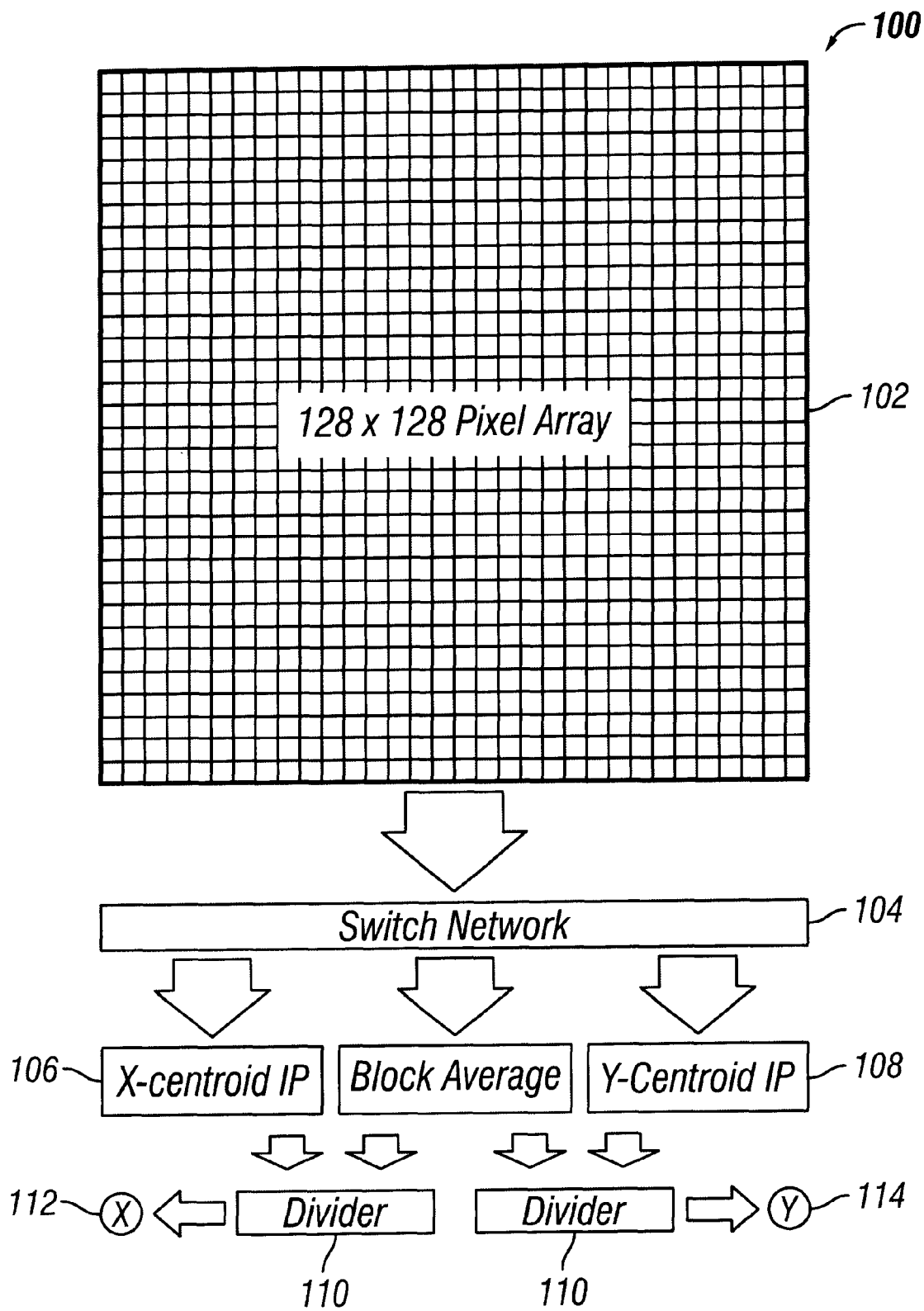
FIG. 1 shows an embodiment of the windowed-centroiding active pixel sensor (APS) system.

An embodiment of the windowed-centroiding active pixel sensor (APS) system 100 is shown in FIG. 1. The system provides on-chip 2-D centroid computation. The system includes a 2-D imager array 102, a switching network 104, inner-product (IP) computation circuits 106, 108, and an analog divider 110. The 2-D computation is performed by computing the relevant inner-products or weighted sums for a given row. Upon completion of all row-wise inner-products, these values are processed to generate the final X and Y inner-products. A divider circuit 110 is then used to generate the X- 112 and Y-centroids 114.

The X- and Y-centroids 112, 114 provided by the on-focal-plane circuits 102-110 are computed as follows:

$$X_{nxn} = \frac{2 \cdot (n+1)}{[n(n-1)+2]} \cdot \frac{\sum_{i=1}^{n}\sum_{j=1}^{n} x_{j-1} V_{ij}}{\sum_{i=1}^{n}\sum_{j=1}^{n} V_{ij}} \quad [1]$$

$$Y_{nxn} = \frac{2}{(n-1)} \cdot \frac{\sum_{i=1}^{n} y_{i-1} \sum_{j=1}^{n} V_{ij}}{\sum_{i=1}^{n}\sum_{j=1}^{n} V_{ij}}$$

where $x_i$ and $y_j$=1, 2, 3, . . . , n−1, respectively, and $v_{ij}$ is the voltage of each pixel. Both computations may yield the correct value of the respective centroids except for a scaling pre-factor.

Figure 2A:
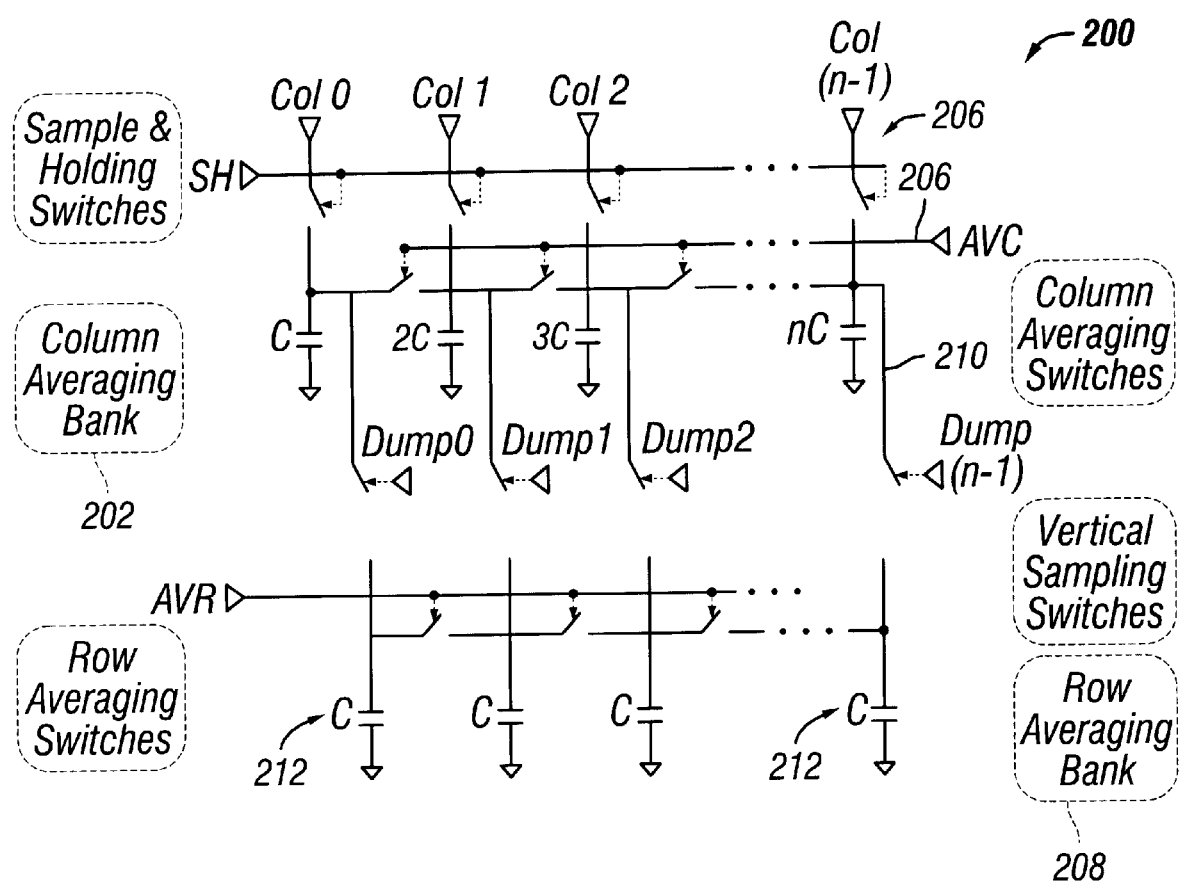
FIGS. 2A and 2B illustrate circuits used for inner-product computations for the X- and Y-centroid blocks, respectively.
Figure 2B:
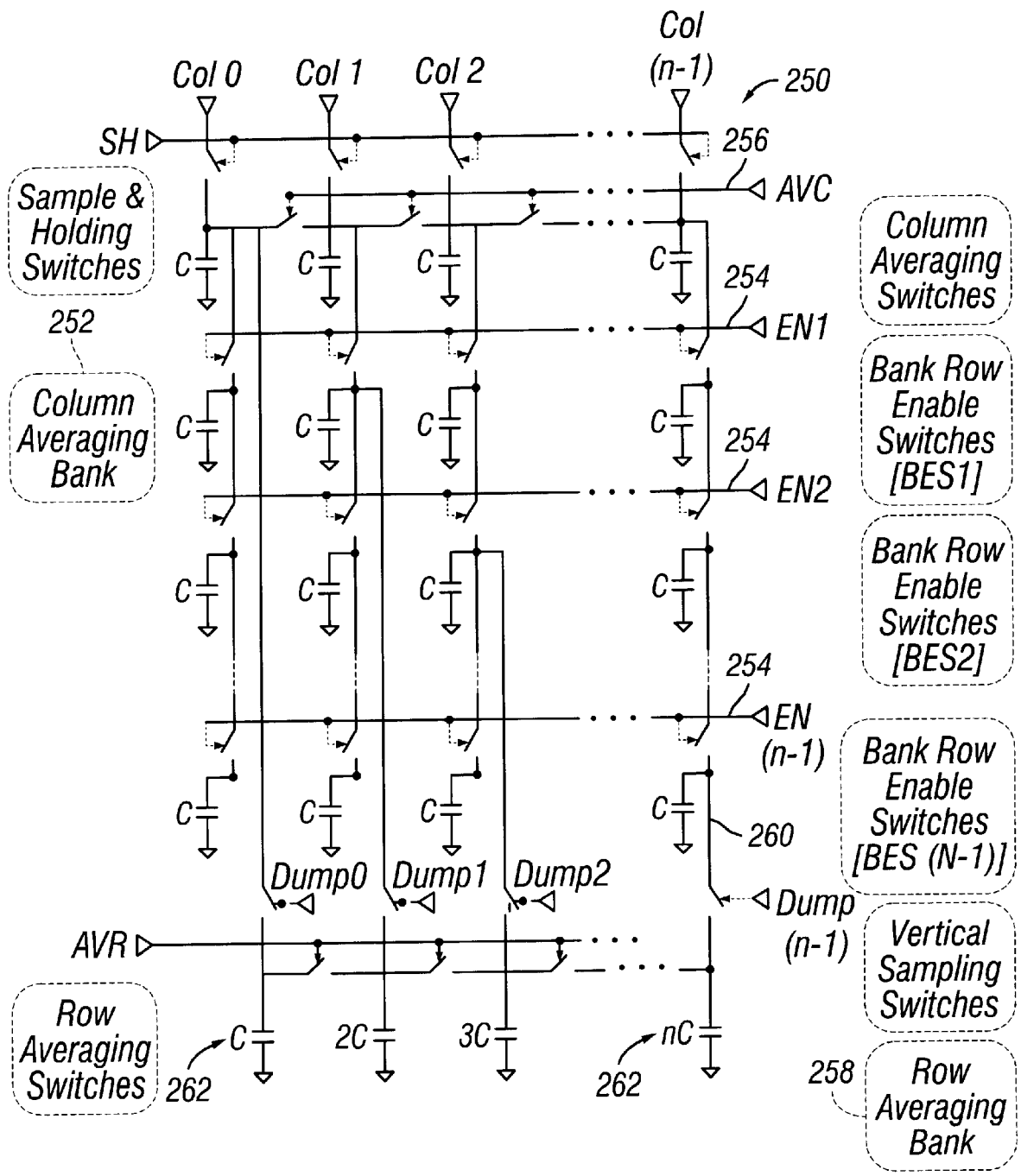

An embodiment of a circuit 200 used for inner-product computations for the X-centroid block 106 is shown in FIG. 2A. An embodiment of a circuit 250 used for inner-product computations for the Y-centroid block 108 is shown in FIG. 2B. Only capacitors and switches are used to perform the computation, with different sized capacitors representing different weights. The capacitors in the column-averaging banks 202, 252 are used for sampling one row of pixel values. The capacitors are linearly scaled in the X-centroid block, while they are the same in successively enabling clocks EN1, EN2, . . . EN(n−1) 254. Averaging over the columns, and sharing the result with one of the capacitors in the row-averaging bank 208, 258 is carried out by pulsing AVC 206, 256 and the appropriated DUMP(i) 210, 260 substantially simultaneously. This allows equal but reduced attenuation for all row signals. The capacitors 262 in the row-averaging bank 258 are linearly scaled for the Y-centroid block 250, while the capacitors 212 are equal for the X-centroid block 200.

In each of the illustrated embodiments, a switching network having an N×9 (N is the imager format) switching array connects 9 consecutive columns of the imager array into the computation circuit. This allows centroid computation for blocks of size 3×3 to 9×9. Thus, the computation is performed in parallel with the imager readout. This parallel computation allows for a high computation speed and substantially reduced computational overhead.

Figure 3:
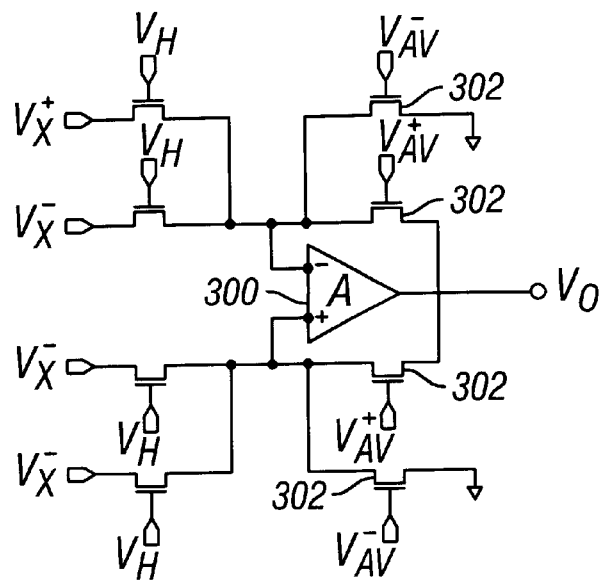
FIG. 3 shows an embodiment a divider circuit.

An embodiment shown in FIG. 3 may be used as the divider circuit 110. The circuit includes an op-amp 300 with a plurality of transistors 302 configured to generate the X- and Y-centroids from the row-wise inner products.

Figure 4:
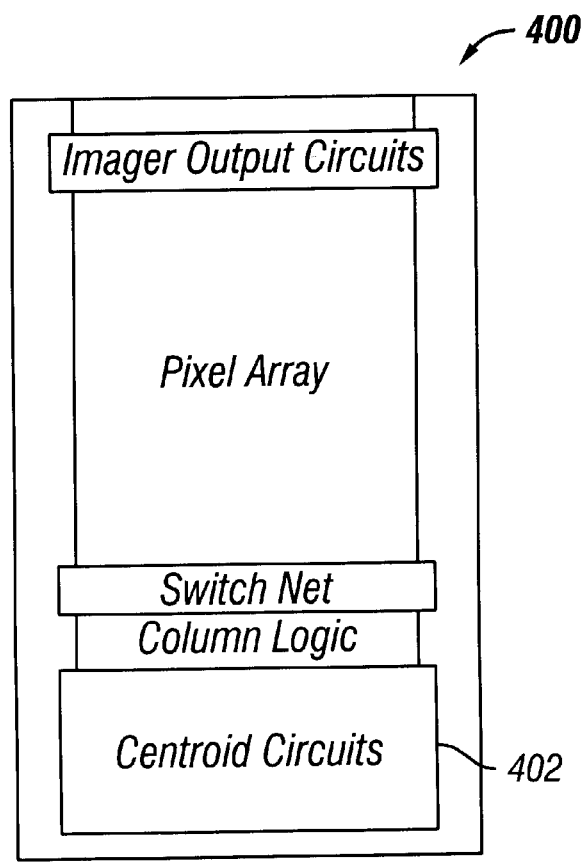
FIG. 4 shows a layout of a prototype imager of 128×128 format according to an embodiment of the present disclosure.

FIG. 4 shows a layout of the prototype imager 400 of 128×128 format. Computation circuits 402 take up only a small area (1.7 mm×0.9 mm), irrespective of the imager format. In the illustrated embodiment, the imager 400 is fabricated using HP 0.5 μm CMOS technology with a 12 μm pixel pitch. The imager 400 has two ports: one for centroid output and the other for imager output.

The performance of the illustrated imager 400 is summarized in Table 1. The Table shows imager performance exceeding that of conventional designs. As shown, the use of passive components and only one op-amp (for the divider circuit) enables low power operation on the order of about 3 mW.

TABLE 1

| Summary of the Centroid APS chip Characteristic | |
|---|---|
| Characteristics | Value |
| Format | 128 × 128 |
| Pixel Size | 12 μm |
| Technology | HP 0.5 μm |
| Power Supply | 3.3 V |
| Saturation Level | 850 mV |
| Conversion Gain | 25 μV/e⁻ |
| Read Noise | 9 e⁻ |
| Dark Current | 78 mV/sec |
| Power | 3 mW |

Figure 5:
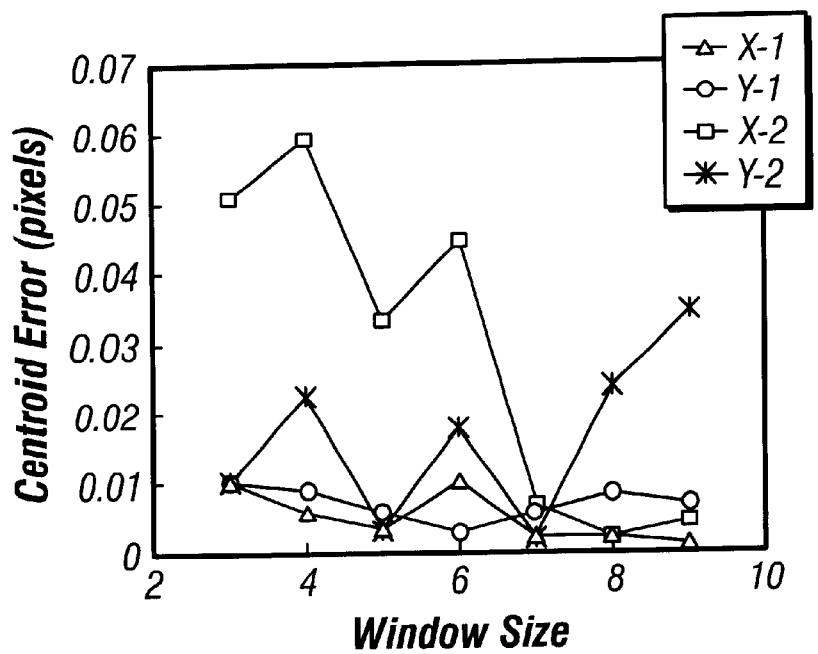
FIG. 5 shows a measured centroid error versus window size.

In order to measure the centroiding accuracy, image centroid may be computed separately by acquiring the raw data from the imager port. The computed centroid may be compared against the value obtained from the centroid port. Relative error (in pixels) may then be computed. The measurements may be repeated for different window sizes, centroid values, mean signal strengths, and from different regions of the imager. The result indicates that a typical centroid error of 0.02 pixel may be achieved over most of the array. According to FIG. 5, the worst-case error was around 0.07 pixel for the smallest sized (3×3) window. FIG. 5 also shows the smallest and the largest centroid error measured from the array. The error dependence on the window size was not large, although in general, the error is found to be lower for larger sized windows.

Figure 6:
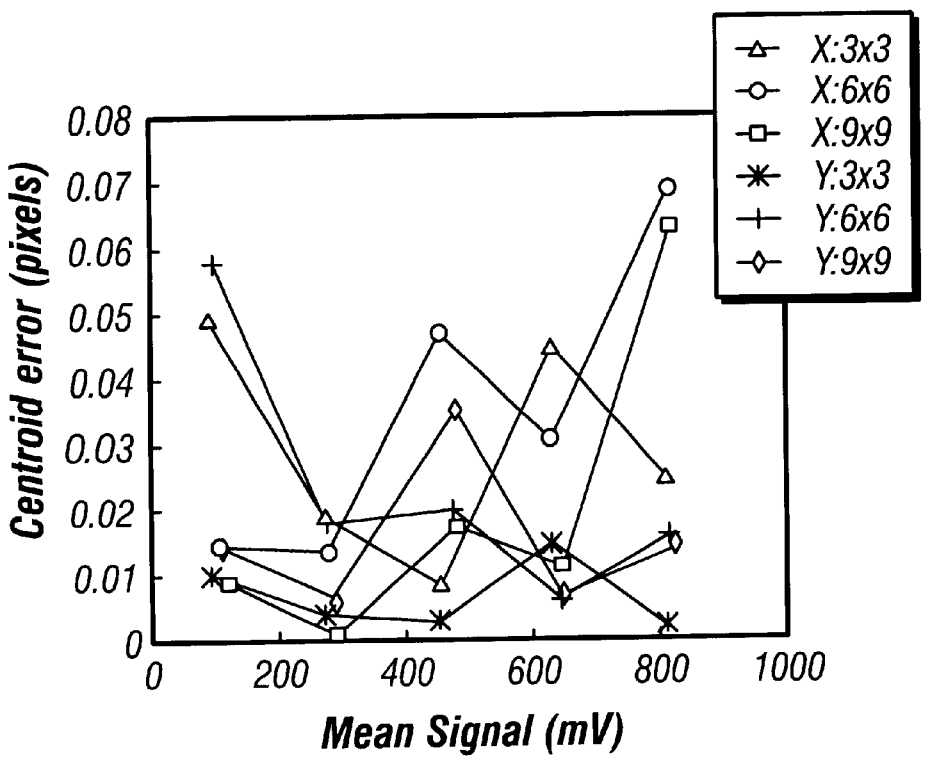
FIG. 6 shows a plot of a centroid error as a function of average signal strength.

With present design of the centroid computation circuit, high update rates may be obtained without compromising centroiding accuracy. Update rates vary from 20 to 50 KHz for window sizes scaling from 9×9 to 3×3. The total noise added by all three centroid computation circuits is small compared to the imager output r.m.s. noise of 225 μV (~9 e⁻). This is achieved by increasing capacitor sizes, with minimum being 2 pF. Large capacitance size also helps to minimize capacitance-matching errors. Residual error in the circuit is governed by matching errors and switch feed-through. Hence, as shown in FIG. 6, the centroiding inaccuracy tends to increase for mean signals less than 100 mV. The residual error also increases for larger mean signal (~800 mV), due to non-linearities and signal saturation.

Description for Embodiments of Photodiode-based CMOS Imager

Figure 7:
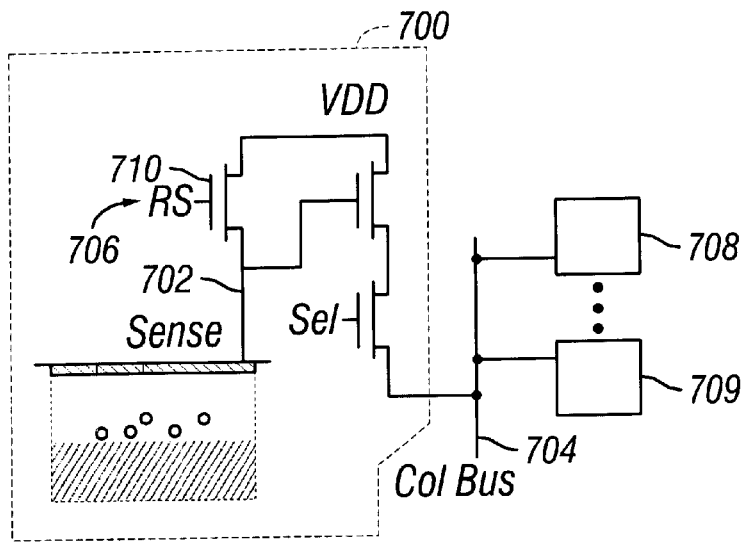
FIG. 7 is a schematic diagram of a photodiode-type CMOS APS pixel according to an embodiment of the present disclosure.

As stated above, a photodiode-based CMOS active pixel sensor (APS) may be used as a CMOS imager that provides image signal input for the centroiding computation. FIG. 7 shows an embodiment of a photodiode-based APS pixel 700. Signal integrated on the photodiode sense node (SENSE)

702 is calculated by measuring the difference between the voltage on the column bus (COL) 704, before and after the reset (RST) 706 is pulsed. Other pixels 708, 709 may be connected to the same column bus 704.

In the illustrated embodiment of FIG. 7, lower kTC noise may be achieved with photodiode-type pixels by employing "soft-reset" technique. The soft-reset includes resetting the pixel with both drain and gate of the n-channel reset transistor 710 kept at the same potential. This results in the sense node 702 being reset using sub-threshold MOSFET current. However, the noise may be lowered at the expense of higher image lag and low-light-level non-linearity. The noise behavior is analyzed and the evidence of degraded performance under low-light levels is shown below. Further, a new pixel design that substantially reduces non-linearity and image lag without compromising noise is presented.

The reset noise at the sense node 702 may be estimated from the time-dependence of the probability distribution function ($F_n$), defined as the probability of finding n electrons on the sense node at a particular moment. In weak-inversion, the current is given by $$I = e^{\frac{q \cdot \Delta V}{mkT}},$$

where DV is the voltage difference between $V_{GS}$ (or $V_{SD}$) and the threshold voltage ($V_T$), KT/q is the thermal potential ($+_T$), and m is the non-ideality factor. Since $V_{DS} \gg \phi_T$, the reverse current is minimal. This makes the current flow substantially unidirectional. Then, $$\frac{\partial F_n}{\partial t} = F_{n-1} g_{n-1} - F_n g_n, \quad [1]$$

where $g_n$, is the probability per unit time of adding an electron in presence of n electrons. The variance in the average number of electrons ($\bar{n}$) on the sense node can be computed from equation 1 to provide:

$$\frac{d\sigma^2}{d\hat{n}} = 1 + 2\frac{dg}{dt}\frac{1}{g}\sigma^2. \quad [2]$$

For weak-inversion condition, $g_n \approx e^{-\beta \cdot n}$, where $$\beta = \frac{q^2}{mkTC}.$$

Equation 2 may then be solved to provide:

$$\sigma^2 = \frac{1}{2\beta}[1 - e^{-2\beta \Delta n} + 2\beta e^{-2\beta \Delta n} \sigma_o^2], \quad [3]$$

where $\sigma_o^2$ is the variance at the onset of the reset process, and $\Delta n$ is the average amount of electrons added to the sense node. For a photodiode type APS under soft-reset, $\sigma_o^2 = 0$ for a given frame, and $$\sigma^2 = \begin{cases} \Delta n & \text{for } \beta \cdot \Delta n \ll 1 \\ mkTC/2 & \text{for } \beta \cdot \Delta n \ll 1 \end{cases}. \quad [4]$$

In other words, if the amount of charges added is small, reset noise is determined by the shot-noise in the amount of electrons. Thus the reset noise may be substantially smaller than kTC. On the other hand, if $\Delta n$ is large, reset noise approaches mkTC/2. If m=1, there is a factor of two reduction in variance for soft-reset.

The reduction in reset noise may be caused by the feedback inherent to the reset mechanism. For an exponential current flow over the barrier, instantaneous current flow may decrease sooner if there is an increase in the node potential. As a result, the distribution of electrons narrows as the reset (under weak-inversion) progresses. This causes sub-kTC reset noise. Further, since the reverse current is negligible, the interaction between power supply fluctuations and the sense node 702 may be significantly reduced. This allows the soft reset to provide high PSRR.

Figure 8:
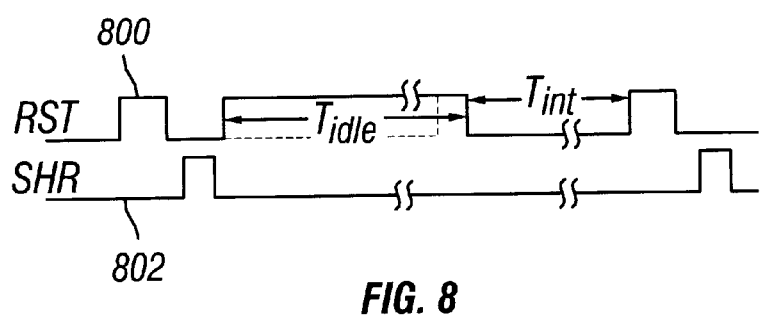
FIG. 8 is a timing diagram of an imager running in digital still mode.

The soft-reset affects imager behavior both under steady-state and dynamic conditions. For example, FIG. 8 illustrates a timing diagram (for still imaging mode) showing the reset (RST) pulse 800 and the signal (SHR) pulse 802 indicating when the reset level is sampled. Keeping the RST 800 high during the idle phase ($t_{idle}$) enables flushing of unwanted charges, but steady-state linearity is substantially degraded. The response non-linearity is a result of the weak-inversion current that causes SENSE node 702 to charge up in a slow logarithmic manner during the idle phase. If the current during the integration phase ($t_{int}$) is small, SENSE node 702 may not be discharged enough for the subsequent reset to affect the potential of the SENSE 702 node. Consequently, the difference between the signal and the reset levels significantly decrease for small signals thereby causing response non-linearity at low-light levels. Furthermore, under soft-reset, actual reset levels may vary depending upon the signal in the previous frame. The actual signal may be calculated by the computed difference between the potential on the sense node before and after reset. Thus, variation of the reset level results in steady-state non-linearity due to modulation of the reset level by the average signal strength. Under dynamic lighting conditions, the reset level will vary from one frame to another depending upon the signal integrated in the previous frame. The variation of the reset levels between successive frames is the measure of image lag. Thus, both steady-state and dynamic response are degraded with soft-reset, even though it results in lower reset noise.

Figure 9:
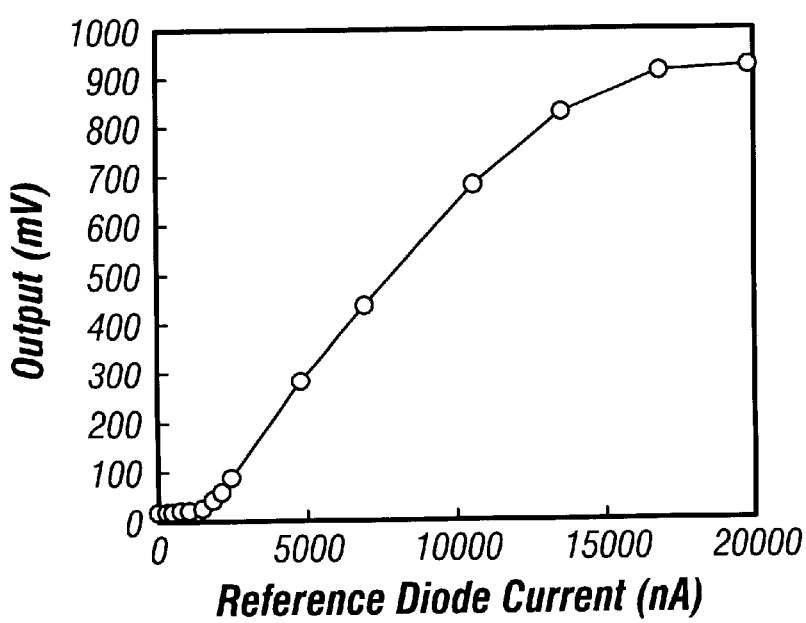
FIG. 9 shows a plot of a response non-linearity with the pixel held in reset state during idling phase.
Figure 10:
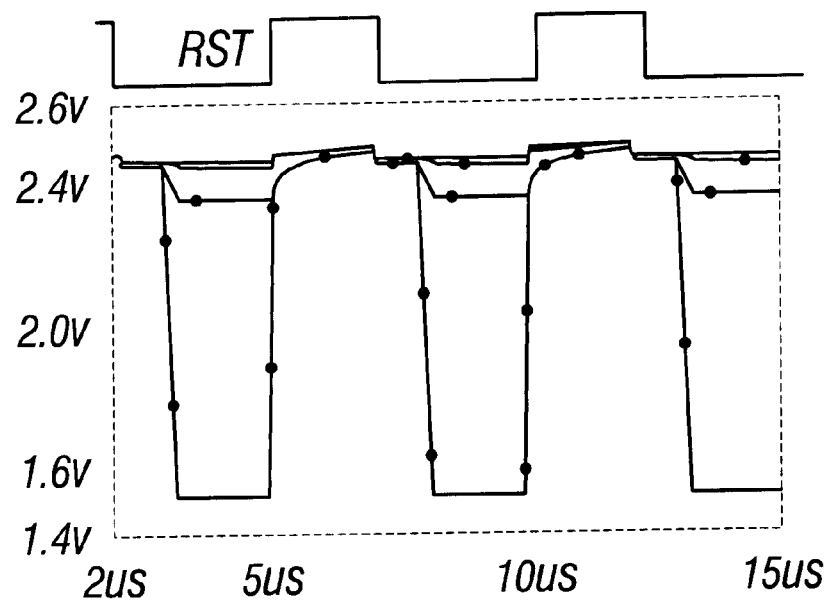
FIG. 10 is a SPICE simulation showing the sense node potentials for different sense node signal excursions as the pixel is periodically reset.

FIG. 9 shows the response measured from a large format (e.g. 512×512) imager operated with the timing shown in FIG. 8. The response "dead-zone" may be seen for low-light levels. The dead-zone may be substantially reduced by holding the reset low during $t_{idle}$. This may prevent biasing of the reset transistor in deep sub-threshold condition. However, the response non-linearity at low-light levels may still be significant. This is illustrated in the SPICE simulation results of FIG. 10. FIG. 10 plots the simulated potential variations of the SENSE node 702 as the node is periodically reset for different voltage excursions during the reset OFF state. The result indicates that the actual reset level is higher by more than 30 mV under low-light-levels. This causes an order of magnitude increase in non-linearity at steady-state. Under dynamic lighting conditions, the reset level may vary from one frame to another depending upon the signal integrated in the previous frame.

Figure 11A:
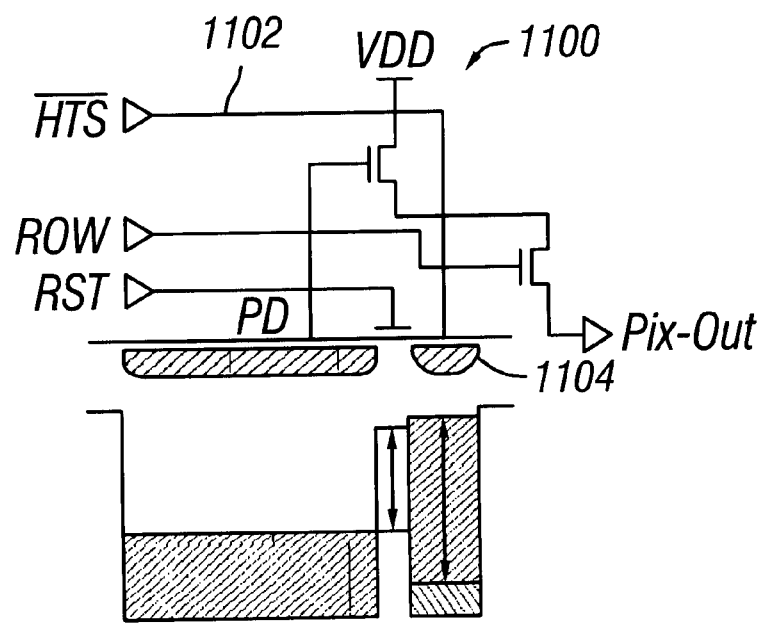
FIG. 11A shows a schematic of a flushed photodiode APS pixel in accordance with an embodiment.
Figure 11B:
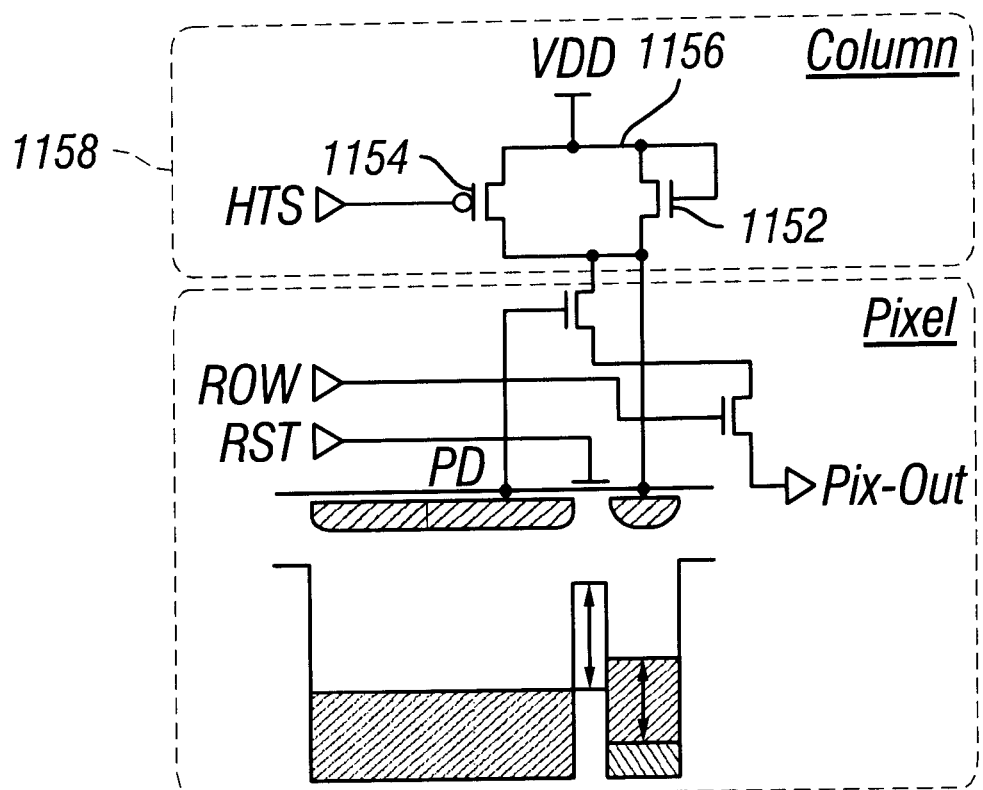
FIG. 11B shows a schematic of an HTS photodiode APS pixel in accordance with an embodiment.

FIGS. 11A and 11B show the flushed 1100 and the hard-to-soft (HTS) 1150 photodiode APS pixels, respectively, in accordance with an embodiment of the present disclosure. The flushed photodiode pixel 1100, shown in FIG. 11A, includes of an additional line ($\overline{HTS}$) 1102 that controls the potential at the drain 1104 of the reset transistor. The HTS photodiode APS 1150 (FIG. 11B) has the same pixel design as that of the flushed APS pixel 1100. However, the power supply ($V_{dd}$) 1156 is routed to each column 1158 through an n- 1152 or p-channel 1154 transistor.

Figure 12:
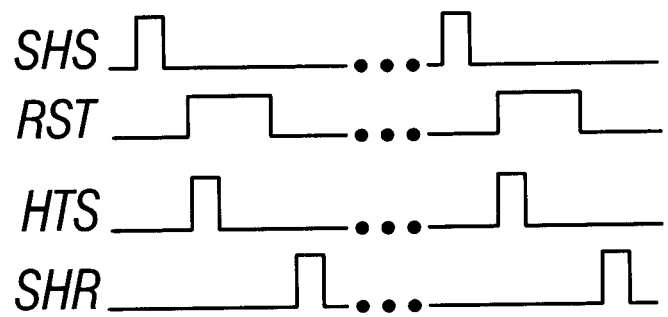
FIG. 12 shows pixel timing diagrams.

FIG. 12 shows a timing diagram of a pixel. HTS is a row-decoded signal for the flushed photodiode pixel 1100, and it is a common signal for the HTS pixel. Momentarily pulsing HTS with the reset (RST) pulse ON causes the pixel to be reset first in hard-reset, followed by a soft-reset. For the HTS pixel, the hard-reset level is determined by the sizing of the transistors, and is set to approximately ½·$V_{dd}$.

Figure 13:
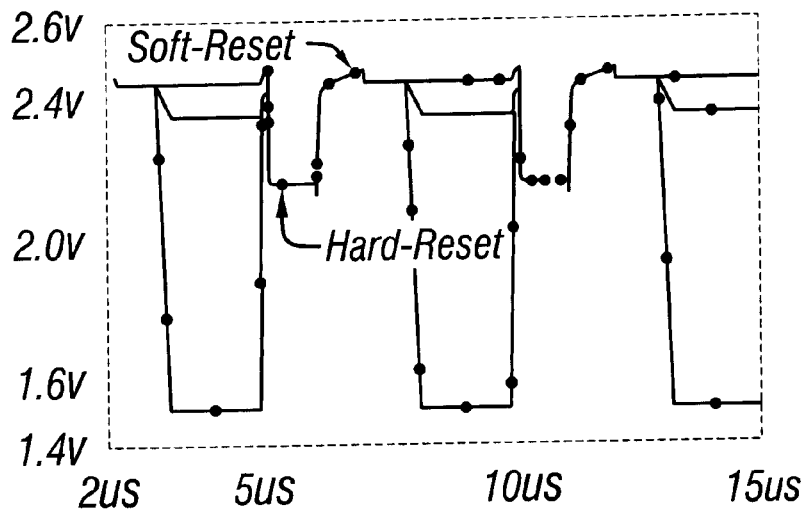
FIG. 13 is a SPICE simulation showing the sense node potentials for different sense node signal excursions as the pixel is periodically reset.

The hard reset erases the pixel memory. Thus, the soft-reset level reaches the same level irrespective of the photo-signal strength, as shown in PSPICE simulations in FIG. 13. Unlike in FIG. 10, the soft-reset level no longer depends upon voltage excursions at SENSE node. HTS mode of operation does not affect the reset noise. Since equation 3 indicates that as long as $\Delta n$ is large, the contribution from the initial variance (due to hard-reset in this case) is low. Therefore, the imager performance does not depend upon the actual value of the hard-reset level.

Figure 14:
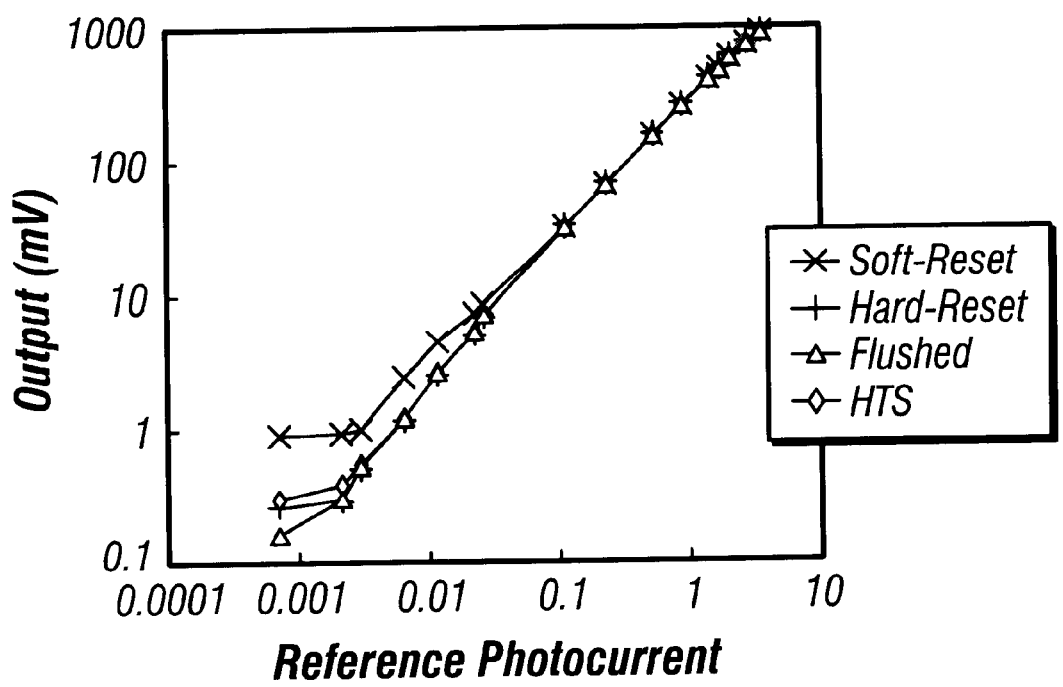
FIG. 14 shows a plot of measured photodiode APS pixel linearity.

A 128×128 test imager with 12 $\mu$m pixels was designed and fabricated in 0.5 $\mu$m CMOS technology to verify the concept. The imager includes different pixels to allow investigation of four different modes of operation: soft-reset, hard-reset, HTS, and flushed. FIG. 14 shows the measured response linearity with the imager operated in double delta sampling mode. The results demonstrate that the imager operated in soft-reset mode exhibits significant low-light level non-linearity. The results also indicate that the non-linearity is undetectable in the other three modes down to the read noise levels (~250–400 $\mu$V r.m.s.).

Figure 15:
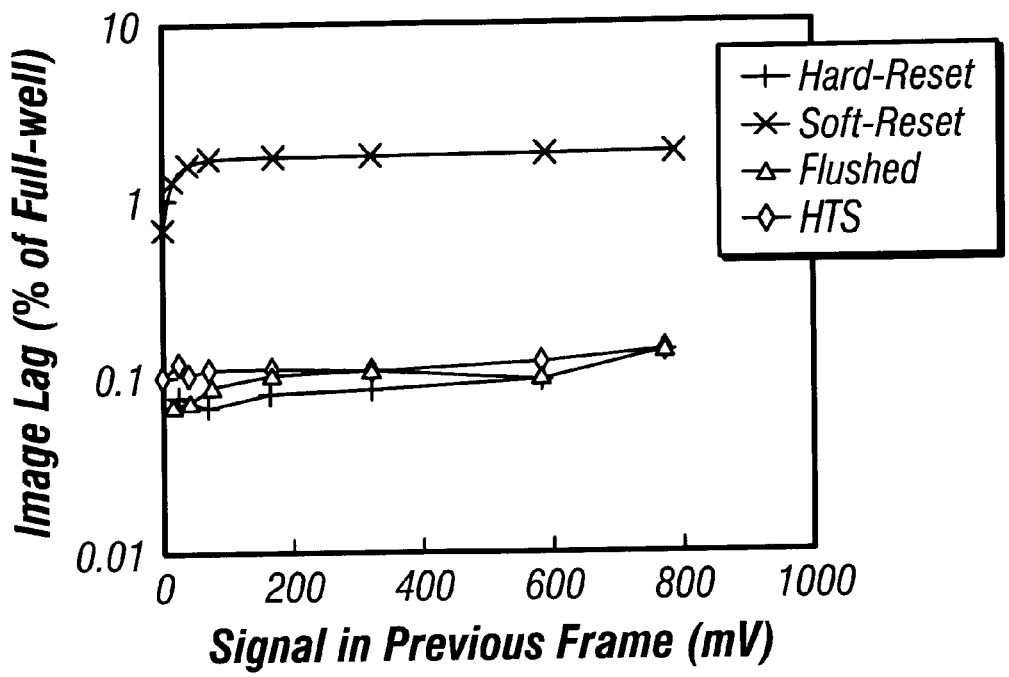
FIG. 15 shows a plot of measured image lag from different photodiodes.

FIG. 15 shows that the image lag is high (~2%) for large signals (in the previous frame). The image lag drops sharply to less than 1% for smaller signals. However, the image lag is undetectable for the other three operating modes.

Figure 16:
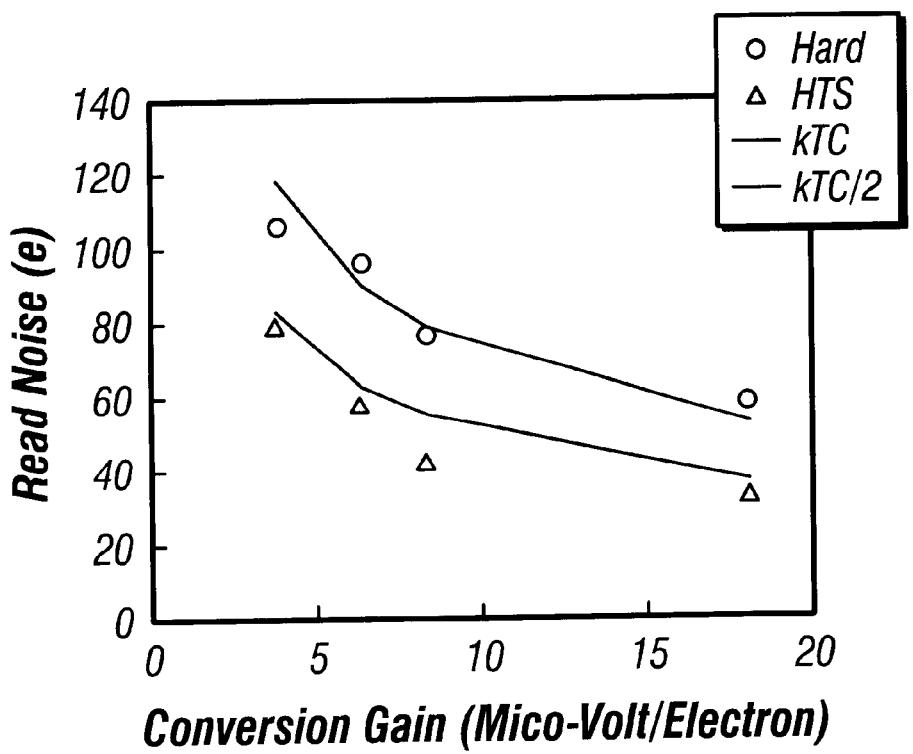
FIG. 16 shows a plot of a noise as a function of the pixel conversion gain.

The measured noise for hard-reset and HTS mode of operations is shown in FIG. 16. The noise performance closely follows the model, with the noise for hard-reset mode being given by $\sqrt{kTC}$, and less than $\sqrt{0.5 \cdot kTC}$ for HTS mode.

While specific embodiments of the invention have been illustrated and described, other embodiments and variations are possible.

All these are intended to be encompassed by the following claims.

What is claimed is:

1. A centroid computation system, comprising:
   an imager array having columns and rows of pixels;
   a switching network adapted to receive pixel signals from said image array;
   a plurality of computation elements coupled to said switching network to receive pixel signals and operating to compute inner products for at least x and y centroids, said plurality of computation elements having only passive elements without an amplifier to provide inner products of pixel signals from said switching network; and
   a divider circuit coupled to said computation elements and adapted to receive said inner products and compute said at least x and y centroids.

2. The system of claim 1, further comprising:
   a block averaging circuit receiving said pixel signals and averaging said pixel signals over said columns.

3. The system of claim 1, wherein said plurality of computation elements include switches and capacitors.

4. The system of claim 3, wherein said plurality of computation elements include row-averaging banks and column-averaging banks.

5. The system of claim 4, wherein said capacitors in said row-averaging banks are substantially similar in value.

6. The system of claim 4, wherein said capacitors in said row-averaging banks are linearly increasing in value.

7. The system of claim 1, wherein said divider circuit includes an op-amp and a transistor in a feedback path of the op-amp.

8. The system as in claim 1, wherein said imager array is a CMOS active pixel sensor array, the system further comprising a semiconductor substrate on which said imager array is formed and integrated, wherein said switching network, said computation elements, and said divider circuit are formed and integrated on said substrate with said imager array to allow for on-chip centroid computation.

9. The system as in claim 8, wherein each pixel includes a photodiode responsive to received radiation to produce charge.

10. The system as in claim 9, wherein said photodiode includes:
    a sensing node to output said charge;
    an output transistor having a gate coupled to said sensing node to produce a pixel signal representing said charge; and
    a reset transistor having a source formed from said sensing node, a gate coupled to receive a reset signal, and a drain coupled to a separate reset control signal which is pulsed on and off when said reset signal remains on to reset said sensing node and to erase a memory in said photodiode from a previous readout cycle.

11. The system as in claim 1, wherein said switching network is configured and coupled to said imager array to connect a plurality of columns of pixels in parallel to said computation elements for parallel processing.

12. A system having an imager array, comprising:
    a substrate;
    an imager array integrated on said substrate and formed of CMOS active pixel sensors;
    a switching network integrated on said substrate and coupled to said imager array to receive pixel signals from said image array;
    at least one centroid computation circuit integrated on said substrate and coupled to said switching network to compute inner products for at least x and y centroids, said at least one centroid computation circuit having only passive elements without amplifiers to provide inner products of pixel signals from said switching network; and
    a divider circuit integrated on said substrate and adapted to receive said inner products and compute said at least x and y centroids.

13. The system of claim 12, further comprising:
    a block averaging circuit, integrated on said substrate, receiving said pixel signals and averaging said pixel signals over said columns.

14. The system as in claim 12, wherein said switching network is configured and coupled to said imager array to connect a plurality of columns of pixels in parallel to said at least one centroid computation circuit for parallel processing.

15. The system as in claim 12, wherein said least one centroid computation circuit includes capacitors that carry out centroid computations.

* * * * *